US010462866B2

(12) United States Patent
Peng (10) Patent No.: US 10,462,866 B2
(45) Date of Patent: Oct. 29, 2019

(54) BURNING ADDRESS METHOD FOR LIGHT EMITTING DIODE LAMP

(71) Applicant: Semisilicon Technology Corp., New Taipei (TW)

(72) Inventor: Wen-Chi Peng, New Taipei (TW)

(73) Assignee: SEMISILICON TECHNOLOGY CORP., New Taipei (TW)

( * ) Notice: Subject to any disclaimer, the term of this patent is extended or adjusted under 35 U.S.C. 154(b) by 0 days.

(21) Appl. No.: 16/237,045

(22) Filed: Dec. 31, 2018

(65) Prior Publication Data

US 2019/0141809 A1    May 9, 2019

Related U.S. Application Data

(60) Division of application No. 15/629,014, filed on Jun. 21, 2017, now Pat. No. 10,231,303, which is a continuation-in-part of application No. 14/521,118, filed on Oct. 22, 2014, now Pat. No. 9,930,734.

(51) Int. Cl.
| H05B 33/08 | (2006.01) |
|---|---|
| H05B 37/02 | (2006.01) |
| H04L 29/12 | (2006.01) |

(52) U.S. Cl.
CPC ..... *H05B 33/0845* (2013.01); *H05B 33/0821* (2013.01); *H05B 37/0245* (2013.01); *H05B 37/0272* (2013.01); *H04L 61/2038* (2013.01); *H04L 61/2046* (2013.01)

(58) Field of Classification Search
CPC ................... H04L 61/2046; H05B 37/0272
See application file for complete search history.

(56) References Cited

U.S. PATENT DOCUMENTS

| 6,119,255 | A | 9/2000 | Akram |
| 7,015,825 | B2 | 3/2006 | Callahan |
| 8,344,659 | B2 * | 1/2013 | Shimomura ....... H05B 37/0245 315/307 |
| 9,060,395 | B1 * | 6/2015 | Peng ................. H05B 33/0809 |
| 9,173,259 | B1 | 10/2015 | Peng |
| 2003/0188202 | A1 | 10/2003 | D'Angelo et al. |

(Continued)

FOREIGN PATENT DOCUMENTS

| CN | 101603648 A | 12/2009 |
| CN | 101636023 A | 1/2010 |

(Continued)

*Primary Examiner* — Tung X Le
*Assistant Examiner* — Borna Alaeddini
(74) *Attorney, Agent, or Firm* — Muncy, Geissler, Olds & Lowe, P.C.

(57) ABSTRACT

A light emitting diode lamp receiving a contactless burning signal includes at least a light emitting diode and a light emitting diode driving apparatus. The light emitting diode driving apparatus includes a burning signal detector, an address burning controller, an address memory and a light emitting diode driving circuit. The burning signal detector wirelessly receives a wireless address signal from outside. The burning signal detector converts the wireless address signal into a local address signal. The burning signal detector transmits the local address signal to the address burning controller. The address burning controller burns the local address signal into the address memory, so that the address memory stores a local address data.

1 Claim, 5 Drawing Sheets

(56) References Cited

U.S. PATENT DOCUMENTS

| | | | |
|---|---|---|---|
| 2007/0046590 A1 | 3/2007 | Umezaki | |
| 2007/0159422 A1 | 7/2007 | Blandino | |
| 2009/0171510 A1* | 7/2009 | Hu | H05B 33/0857 |
| | | | 700/292 |
| 2009/0244043 A1 | 10/2009 | Kasai et al. | |
| 2009/0289578 A1* | 11/2009 | Peng | H05B 33/0869 |
| | | | 315/294 |
| 2011/0096099 A1 | 4/2011 | Yamamoto et al. | |
| 2011/0109228 A1* | 5/2011 | Shimomura | H05B 37/0245 |
| | | | 315/113 |
| 2011/0193484 A1 | 8/2011 | Harbers et al. | |
| 2011/0266976 A1 | 11/2011 | Zhang | |
| 2013/0147370 A1 | 6/2013 | Williams et al. | |
| 2013/0169178 A1 | 7/2013 | Peng | |
| 2014/0265880 A1 | 9/2014 | Taipale et al. | |
| 2014/0270797 A1* | 9/2014 | Pederson | H04B 10/1143 |
| | | | 398/128 |
| 2015/0245435 A1 | 8/2015 | Peng | |
| 2015/0282282 A1 | 10/2015 | Breuer et al. | |
| 2015/0289330 A1 | 10/2015 | Peng | |
| 2017/0004753 A1 | 1/2017 | Kim et al. | |

FOREIGN PATENT DOCUMENTS

| | | |
|---|---|---|
| CN | 201521844 U | 7/2010 |
| CN | 202496103 U | 10/2012 |
| CN | 203788523 U | 8/2014 |
| WO | WO 2008/048516 A2 | 4/2008 |

* cited by examiner

BURNING ADDRESS METHOD FOR LIGHT EMITTING DIODE LAMP

CROSS-REFERENCE TO RELATED APPLICATIONS

This application is a divisional application of U.S. patent application Ser. No. 15/629,014, filed on Jun. 21, 2017, and entitled "LIGHT EMITTING DIODE LAMP RECEIVING CONTACTLESS BURNING SIGNAL AND SYSTEM FOR THE SAME AND BURNING ADDRESS METHOD FOR THE SAME", which is a continuation in part of U.S. patent application Ser. No. 14/521,118, filed on Oct. 22, 2014. The entire disclosures of the above application are all incorporated herein by reference.

BACKGROUND OF THE INVENTION

Field of the Invention

The present invention relates to a light emitting diode lamp and a system for the same and a burning address method for the same, and especially relates to a light emitting diode lamp receiving a contactless burning signal and a system for the same and a burning address method for the same.

Description of the Related Art

Currently, there are two types of the related art light emitting diode lamps: the serial-type light emitting diode lamp and the parallel-type light emitting diode lamp. Both the serial-type light emitting diode lamp and the parallel-type light emitting diode lamp need to use a plurality of power transmission lines and signal transmission lines, which waste wires. Afterwards, the related art technology which transmits the lighting signal through the power transmission lines is provided to save the signal transmission lines, wherein the lighting signal comprises the lighting data and the address data.

The local address data has to be burned into the light emitting diode driving apparatus when the light emitting diode driving apparatus is manufactured. The light emitting diode driving apparatus checks whether the address data of the lighting signal is the same with the local address data or not when the light emitting diode driving apparatus receives the lighting signal mentioned above. The light emitting diode driving apparatus drives the light emitting diode to light according to the lighting data of the lighting signal if the address data of the lighting signal is the same with the local address data of the light emitting diode driving apparatus.

However, the disadvantage of the method mentioned above is that once the light emitting diode driving apparatus has been manufactured, the local address data cannot be changed. Therefore, it is very inconvenient for the warehouse management. Moreover, it is also very inconvenient for assembling a lot of the light emitting diode driving apparatuses because the operator has to check the local address data of every light emitting diode driving apparatus carefully to avoid assembling the incorrect light emitting diode driving apparatus.

SUMMARY OF THE INVENTION

In order to solve the above-mentioned problems, a first object of the present invention is to provide a light emitting diode lamp receiving a contactless burning signal.

In order to solve the above-mentioned problems, a second object of the present invention is to provide a light emitting diode system receiving the contactless burning signal.

In order to solve the above-mentioned problems, a third object of the present invention is to provide a burning address method for the light emitting diode lamp receiving the contactless burning signal.

In order to achieve the first object of the present invention mentioned above, the light emitting diode lamp of the present invention comprises at least a light emitting diode and a light emitting diode driving apparatus. The light emitting diode driving apparatus is electrically connected to the light emitting diode. The light emitting diode driving apparatus comprises a burning signal detector, an address burning controller, an address memory and a light emitting diode driving circuit. The address burning controller is electrically connected to the burning signal detector. The address memory is electrically connected to the address burning controller. The light emitting diode driving circuit is electrically connected to the light emitting diode and the address memory. The burning signal detector wirelessly receives a wireless address signal from outside. The burning signal detector converts the wireless address signal into a local address signal. The burning signal detector transmits the local address signal to the address burning controller. The address burning controller burns the local address signal into the address memory, so that the address memory stores a local address data.

In order to achieve the second object of the present invention mentioned above, the light emitting diode system of the present invention comprises a light emitting diode lamp and a burner. The burner is wirelessly electrically connected to the light emitting diode lamp. The light emitting diode lamp comprises at least a light emitting diode and a light emitting diode driving apparatus. The light emitting diode driving apparatus is electrically connected to the light emitting diode. The light emitting diode driving apparatus comprises a burning signal detector, an address burning controller, an address memory and a light emitting diode driving circuit. The address burning controller is electrically connected to the burning signal detector. The address memory is electrically connected to the address burning controller. The light emitting diode driving circuit is electrically connected to the light emitting diode and the address memory. The burning signal detector wirelessly receives a wireless address signal from outside. The burning signal detector converts the wireless address signal into a local address signal. The burning signal detector transmits the local address signal to the address burning controller. The address burning controller burns the local address signal into the address memory, so that the address memory stores a local address data. The burner comprises a light emitting unit and a light receiving unit. The light receiving unit is electrically connected to the light emitting unit. The light emitting unit wirelessly transmits a wireless starting signal and the wireless address signal to the light emitting diode lamp. The local address data is determined whether the local address data is correct or not.

In order to achieve the third object of the present invention mentioned above, the burning address method of the present invention comprises following steps. A light emitting diode lamp wirelessly receives a wireless signal from outside. The light emitting diode lamp determines whether the wireless signal comprises a wireless starting signal or not. If the wireless signal comprises the wireless starting signal, the light emitting diode lamp performs a burning procedure to convert a wireless address signal in/of the wireless signal into a local address data and stores the local address data into an address memory. If the wireless signal does not comprise the wireless starting signal, the light emitting diode lamp does not perform (namely, omits) the burning procedure.

The advantage of the present invention is to burn the local address data into the light emitting diode driving apparatus which had been manufactured to store or change the local address data.

DETAILED DESCRIPTION OF THE INVENTION

Figure 1:
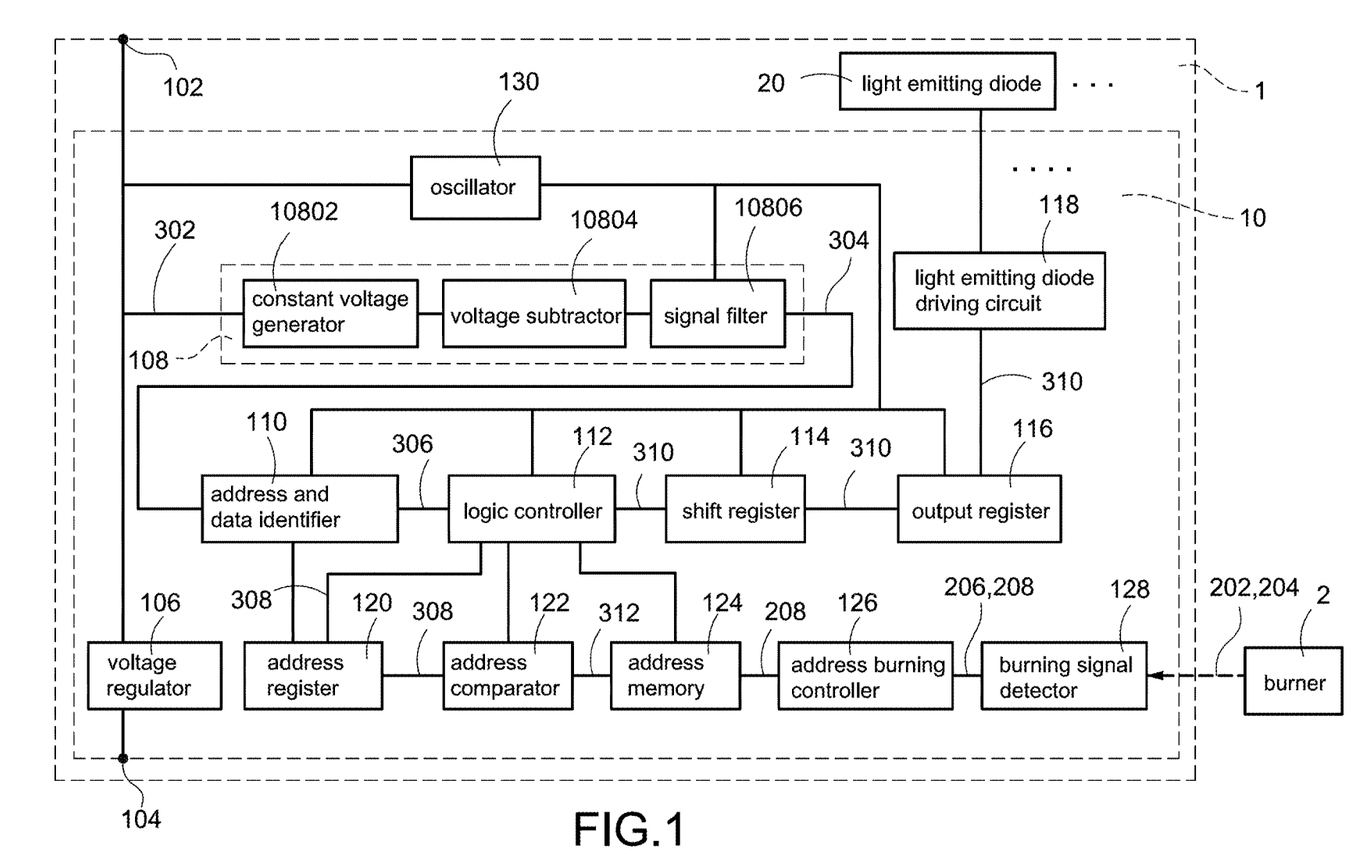
FIG. 1 shows a block diagram of the light emitting diode lamp of the present invention.

Please refer to following detailed description and figures for the technical content of the present invention:

FIG. 1 shows a block diagram of the light emitting diode lamp of the present invention. A light emitting diode lamp 1 receiving a contactless burning signal is applied to a burner 2. The light emitting diode lamp 1 comprises a light emitting diode driving apparatus 10, at least a light emitting diode 20, a positive contact 102 and a negative contact 104. The light emitting diode driving apparatus 10 comprises a voltage regulator 106, a signal conversion unit 108, an address and data identifier 110, a logic controller 112, a shift register 114, an output register 116, a light emitting diode driving circuit 118, an address register 120, an address comparator 122, an address memory 124, an address burning controller 126, a burning signal detector 128 and an oscillator 130. The signal conversion unit 108 comprises a constant voltage generator 10802, a voltage subtractor 10804 and a signal filter 10806. The voltage subtractor 10804 can be replaced by a voltage comparator as well.

The light emitting diode driving apparatus 10 is electrically connected to the light emitting diode 20. The voltage regulator 106 is electrically connected to the positive contact 102, the negative contact 104 and the signal conversion unit 108. The signal conversion unit 108 is electrically connected to the positive contact 102. The address and data identifier 110 is electrically connected to the signal conversion unit 108. The logic controller 112 is electrically connected to the address and data identifier 110 and the address memory 124. The shift register 114 is electrically connected to the logic controller 112. The output register 116 is electrically connected to the shift register 114 and the light emitting diode driving circuit 118. The light emitting diode driving circuit 118 is electrically connected to the light emitting diode 20 and the address memory 124. The address register 120 is electrically connected to the address and data identifier 110 and the logic controller 112. The address comparator 122 is electrically connected to the logic controller 112, the address register 120 and the address memory 124. The address memory 124 is electrically connected to the address burning controller 126. The address burning controller 126 is electrically connected to the burning signal detector 128. The oscillator 130 is electrically connected to the positive contact 102, the voltage regulator 106, the signal conversion unit 108, the address and data identifier 110, the logic controller 112, the shift register 114 and the output register 116. The constant voltage generator 10802 is electrically connected to the positive contact 102. The voltage subtractor 10804 is electrically connected to the constant voltage generator 10802. The signal filter 10806 is electrically connected to the voltage subtractor 10804 and the address and data identifier 110.

The burning signal detector 128 wirelessly receives a wireless starting signal 202 and a wireless address signal 204 from outside (namely, from the burner 2). The burning signal detector 128 converts the wireless starting signal 202 into a wired starting signal 206 and converts the wireless address signal 204 into a local address signal 208. The burning signal detector 128 orderly transmits the wired starting signal 206 and the local address signal 208 to the address burning controller 126. When the address burning controller 126 receives the wired starting signal 206, the address burning controller 126 is configured to burn the local address signal 208 into the address memory 124, so that the address memory 124 stores a local address data 312.

The signal conversion unit 108 receives a first signal 302 through the positive contact 102. The signal conversion unit 108 converts the first signal 302 into a second signal 304 and sends the second signal 304 to the address and data identifier 110. The address and data identifier 110 identifies the second signal 304 to obtain a third signal 306. The third signal 306 comprises an address data 308 and a lighting data 310. The address and data identifier 110 sends the third signal 306 to the logic controller 112. The logic controller 112 sends the address data 308 to the address register 120. The address comparator 122 compares the address data 308 with the local address data 312 stored in the address memory 124. If the address data 308 is the same with the local address data 312, the address comparator 122 informs the logic controller 112 that the address data 308 is the same with the local address data 312, so that the logic controller 112 sends the lighting data 310 to the light emitting diode driving circuit 118 through the shift register 114 and the output register 116. The light emitting diode driving circuit 118 drives the light emitting diode 20 to light according to the lighting data 310.

Moreover, the contactless burning signal of the present invention can be a light signal, an infrared signal and a high frequency signal and so on. If necessary, the present invention can add (namely, comprise) an ending signal to indicate that the wireless starting signal 202 and the wireless address signal 204 have been transmitted completely. The address memory 124 can be a one-time programmable memory or a multiple-time programmable memory, such as an e-fuse memory, an erasable programmable read only memory (ER-POM), an electrically erasable programmable read only memory (EEPROM) or a flash memory.

Figure 2:
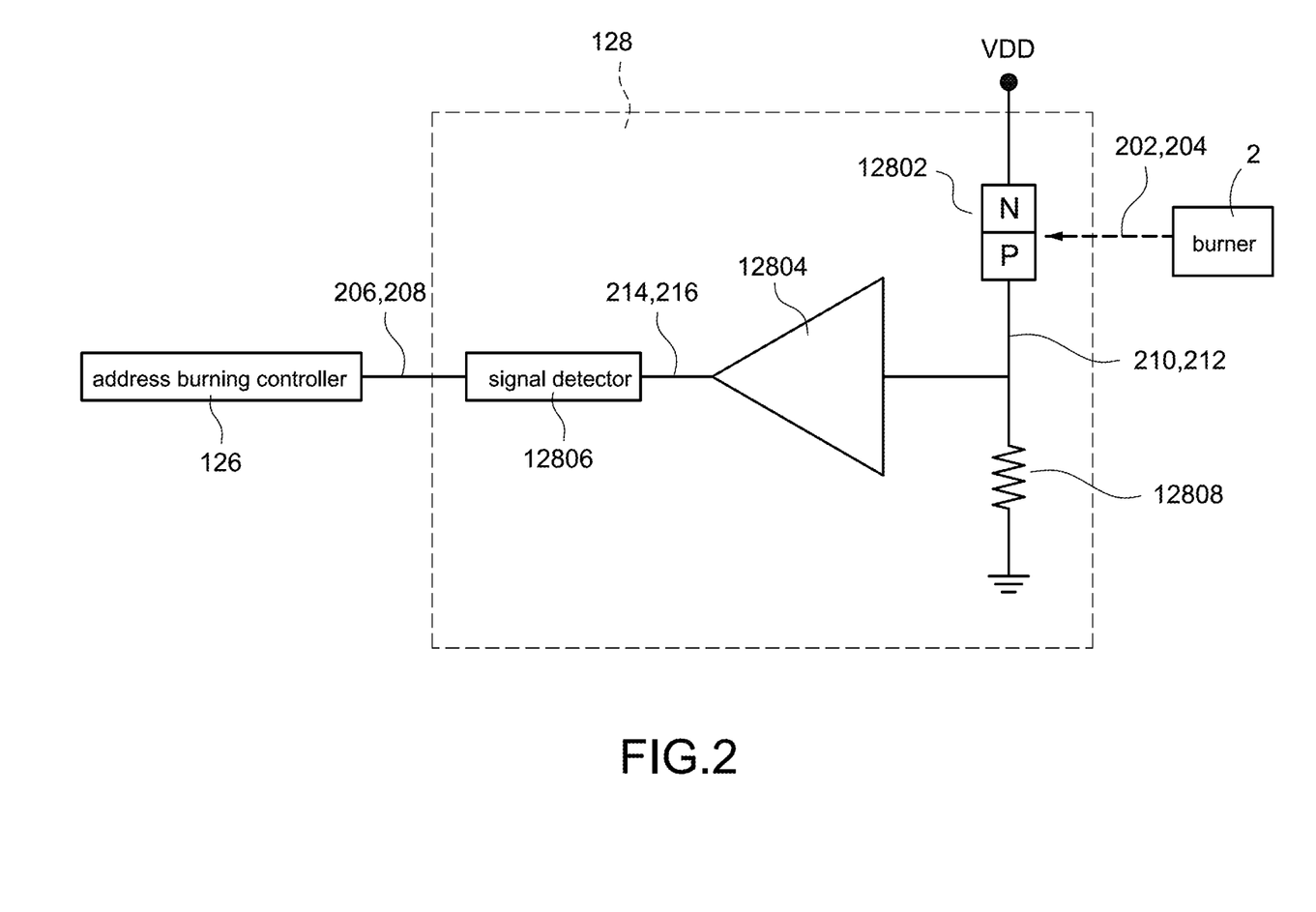
FIG. 2 shows a block diagram of the burning signal detector of the present invention.

FIG. 2 shows a block diagram of the burning signal detector of the present invention. The light emitting diode driving apparatus 10 further comprises a voltage source VDD. The burning signal detector 128 comprises an optical element 12802, an amplifier 12804, a signal detector 12806 and a resistor 12808. The optical element 12802 is electrically connected to the voltage source VDD. The amplifier 12804 is electrically connected to the optical element 12802. The signal detector 12806 is electrically connected to the amplifier 12804 and the address burning controller 126. The resistor 12808 is electrically connected to the amplifier 12804 and the optical element 12802.

The optical element 12802 wirelessly orderly receives the wireless starting signal 202 and the wireless address signal 204 from outside. Namely, the burner 2 wirelessly orderly transmits the wireless starting signal 202 and the wireless address signal 204 to the optical element 12802. The optical element 12802 senses and converts the wireless starting signal 202 into a first sensing signal 210. The optical element 12802 senses and converts the wireless address signal 204 into a second sensing signal 212. The amplifier 12804 amplifies the first sensing signal 210 to obtain a first amplifying signal 214. The amplifier 12804 amplifies the second sensing signal 212 to obtain a second amplifying signal 216. The signal detector 12806 detects the first amplifying signal 214 to obtain the wired starting signal 206. The signal detector 12806 detects the second amplifying signal 216 to obtain the local address signal 208.

The optical element 12802 is a PN junction (or a PN interface) of an integrated circuit, a photo transistor or a photo diode. The PN junction (or the PN interface) generates a leakage electricity phenomenon to be used as the signal source when the PN junction (or the PN interface) is subjected to the light.

Figure 4:
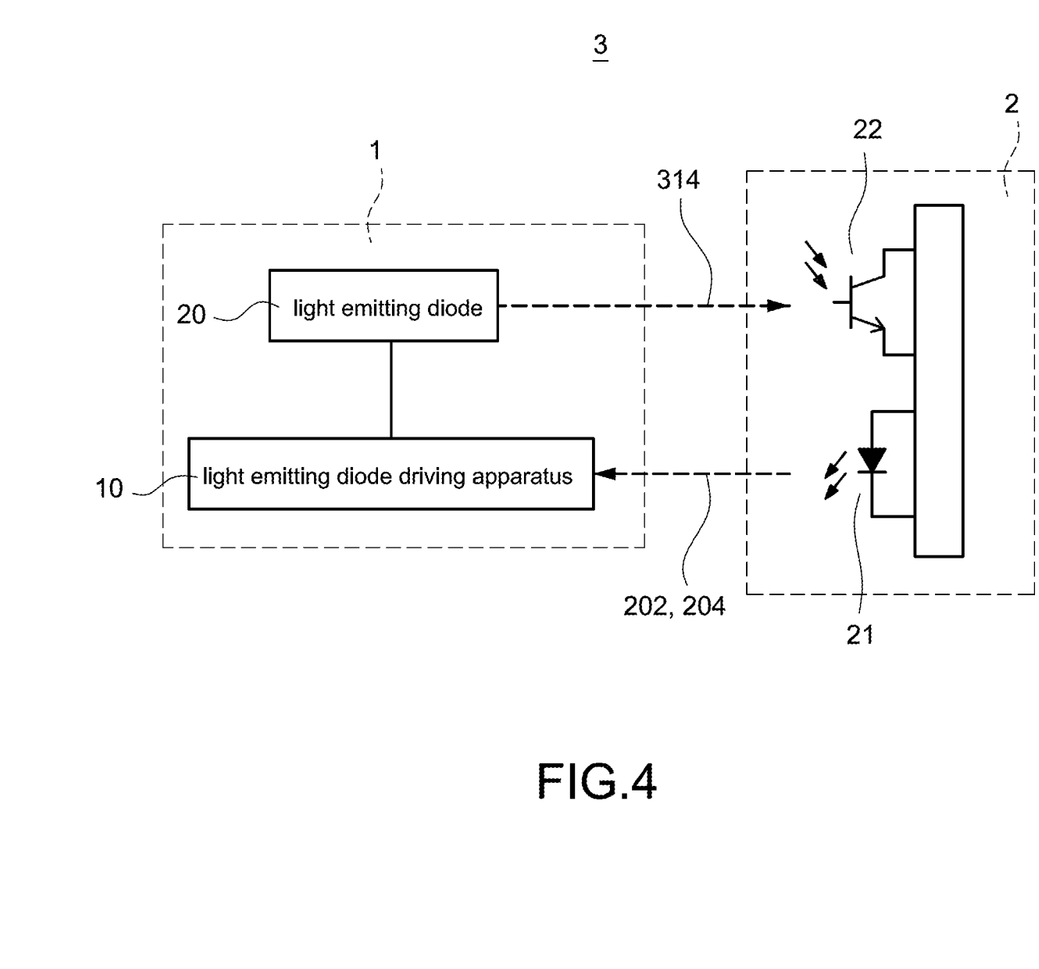
FIG. 4 shows a block diagram of the light emitting diode system of the present invention.

FIG. 4 shows a block diagram of the light emitting diode system of the present invention. The descriptions of the elements shown in FIG. 4 which are the same as the elements shown in FIG. 1 and FIG. 2 are not repeated here for brevity. A light emitting diode system 3 receiving the contactless burning signal comprises the light emitting diode lamp 1 mentioned above and a burner 2. The burner 2 is wirelessly electrically connected to the light emitting diode lamp 1. The burner 2 comprises a light emitting unit 21 and a light receiving unit 22. The light receiving unit 22 is electrically connected to the light emitting unit 21.

The light emitting unit 21 wirelessly transmits the wireless starting signal 202 and the wireless address signal 204 to the light emitting diode lamp 1. The light emitting diode lamp 1 converts the local address data 312 into a wireless local address data 314. The light emitting diode 20 flickeringly lights to transmit the wireless local address data 314 to the light receiving unit 22, so that the burner 2 converts the wireless local address data 314 into the local address data 312 and determines whether the local address data 312 is correct or not. The light receiving unit 22 is a PN junction (or a PN interface), a photo transistor or a photo diode.

Moreover, besides the above-mentioned method for determining whether the local address data 312 is correct or not by the burner 2, the present invention can also utilize the address data 308 and the lighting data 310 mentioned above to determine whether the local address data 312 is correct or not. Namely, as mentioned above, if the address data 308 is the same with the local address data 312, the light emitting diode driving circuit 118 drives the light emitting diode 20 to light according to the lighting data 310. Therefore, if the light emitting diode 20 is able to light, the local address data 312 is determined as correct. If the light emitting diode 20 is not able to light, the local address data 312 is determined as incorrect.

Figure 3:
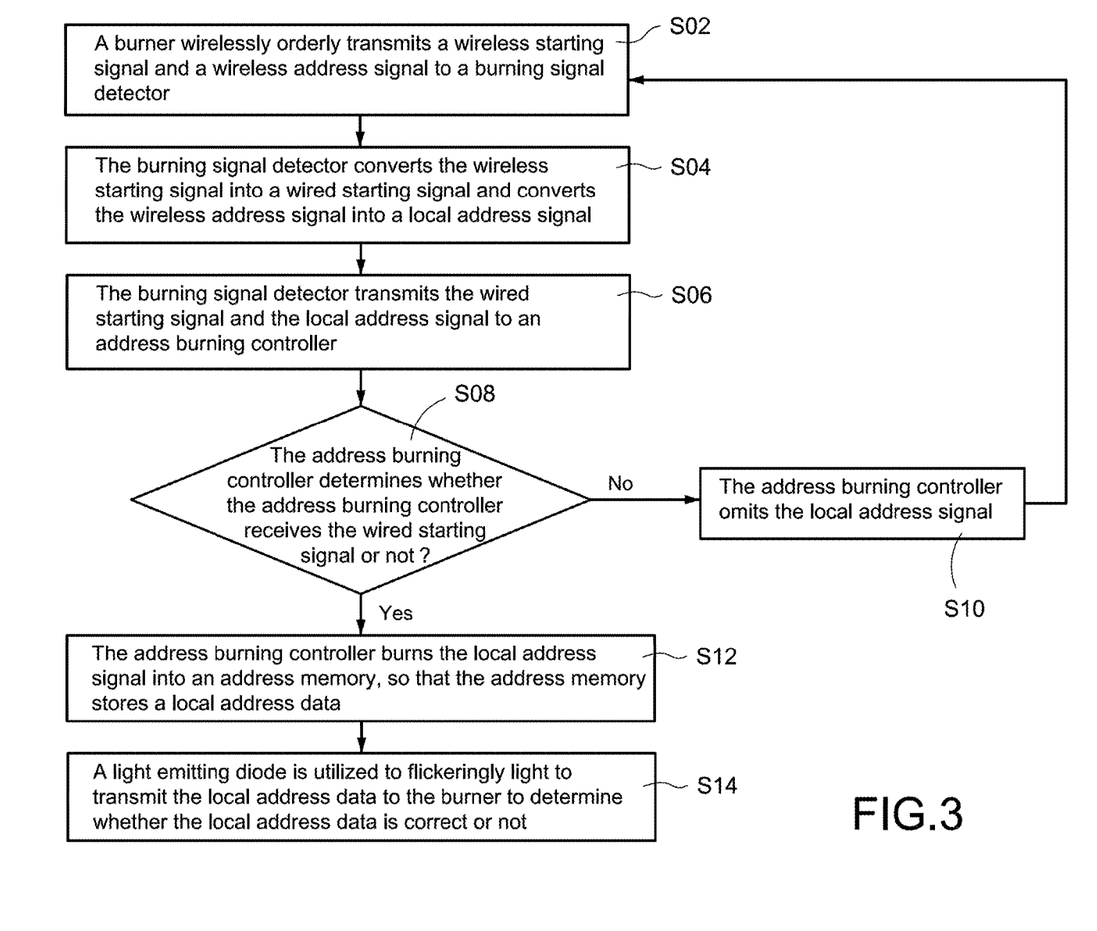
FIG. 3 shows a flow chart of an embodiment of the burning address method of the present invention.

FIG. 3 shows a flow chart of an embodiment of the burning address method of the present invention. A burning address method for the light emitting diode lamp receiving the contactless burning signal of the present invention comprises following steps.

Step S02: A burner wirelessly orderly transmits a wireless starting signal and a wireless address signal to a burning signal detector.

Step S04: The burning signal detector converts the wireless starting signal into a wired starting signal and converts the wireless address signal into a local address signal.

Step S06: The burning signal detector transmits the wired starting signal and the local address signal to an address burning controller.

Step S08: The address burning controller determines whether the address burning controller receives the wired starting signal or not. If not, the burning address method goes to a step S10. If yes, the burning address method goes to a step S12.

Step S10: The address burning controller omits the local address signal. Then the burning address method returns to the step S02.

Step S12: The address burning controller burns the local address signal into an address memory, so that the address memory stores a local address data.

Step S14: A light emitting diode (for example, the light emitting diode 20 shown in FIG. 1) is utilized to flickeringly light to transmit the local address data to the burner to determine whether the local address data is correct or not. If the burner determines that the local address data is incorrect, the burner wirelessly orderly re-transmits the wireless starting signal and the wireless address signal to the burning signal detector. If the burner determines that the local address data is correct, the burning address method is finished or the burning address method for another light emitting diode lamp is performed. Moreover, it is noted that the step S14 is to verify whether the local address data is correct or not, but the step S14 is not an essential step of the burning address method of the present invention.

Figure 5:
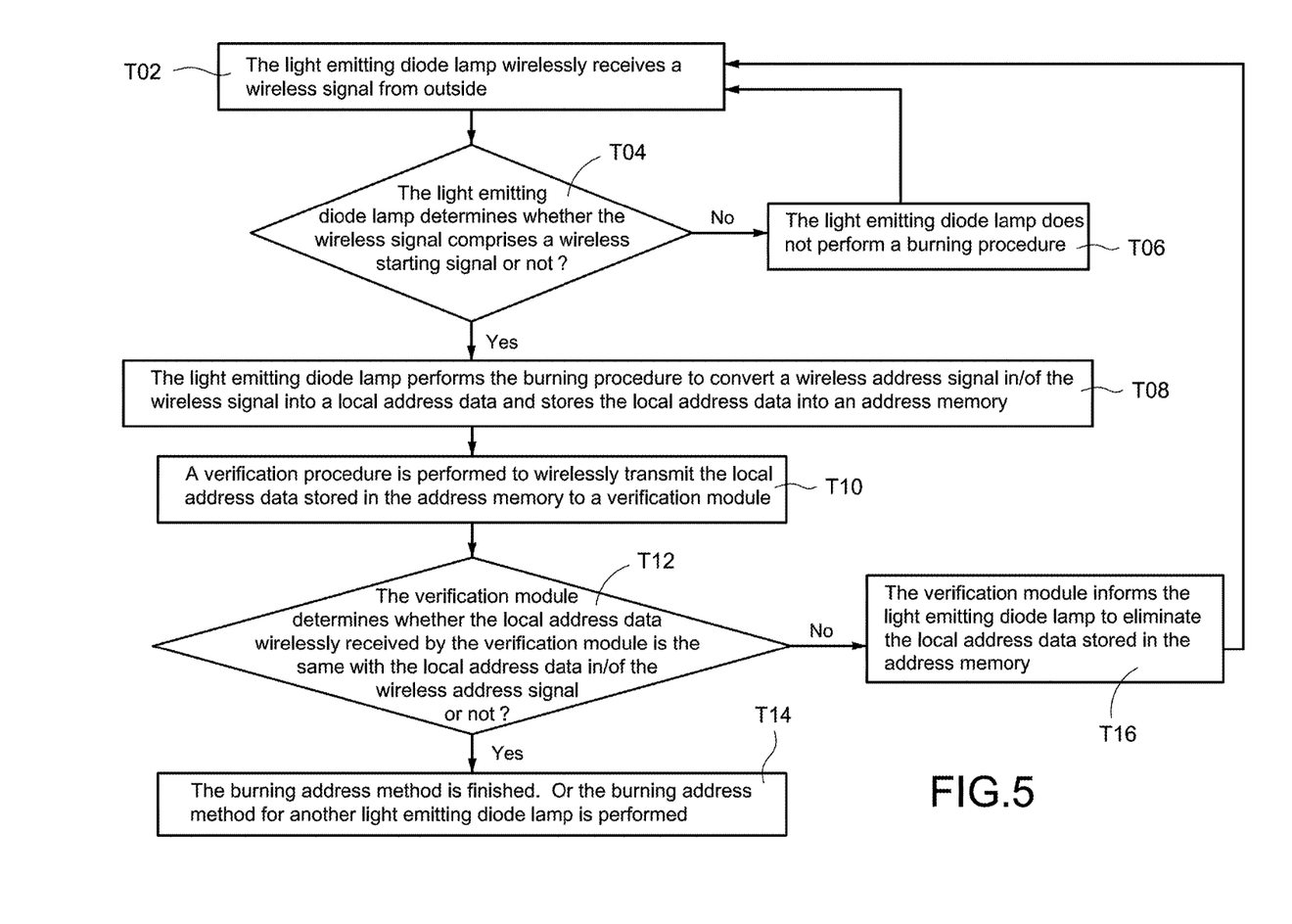
FIG. 5 shows a flow chart of another embodiment of the burning address method of the present invention.

FIG. 5 shows a flow chart of another embodiment of the burning address method of the present invention. A burning address method for the light emitting diode lamp receiving the contactless burning signal of the present invention comprises following steps.

Step T02: The light emitting diode lamp wirelessly receives a wireless signal from outside.

Step T04: The light emitting diode lamp determines whether the wireless signal comprises a wireless starting signal or not. If the wireless signal does not comprise the wireless starting signal, the burning address method goes to a step T06. If the wireless signal comprises the wireless starting signal, the burning address method goes to a step T08.

Step T06: The light emitting diode lamp does not perform (namely, omits) a burning procedure. Then the burning address method returns to the step T02.

Step T08: The light emitting diode lamp performs the burning procedure to convert a wireless address signal in/of the wireless signal into a local address data and stores the local address data into an address memory. After the light emitting diode lamp finishes the burning procedure, the burning address method goes to a step T10.

Step T10: A verification procedure is performed to wirelessly transmit the local address data stored in the address memory to a verification module.

Step T12: The verification module determines whether the local address data wirelessly received by the verification module is the same with the local address data in/of the wireless address signal or not. If the local address data wirelessly received by the verification module is the same with the local address data of the wireless address signal, the burning address method goes to a step T14. If the local address data wirelessly received by the verification module is not the same with the local address data of the wireless address signal, the burning address method goes to a step T16.

Step T14: The burning address method is finished. Or the burning address method for another light emitting diode lamp is performed.

Step T16: The verification module informs the light emitting diode lamp to eliminate the local address data stored in the address memory. Then the burning address method returns to the step T02.

It is noted that the steps T10~16 mentioned above are to verify whether the local address data is correct or not, but the steps T10~16 mentioned above are not essential steps of the burning address method of the present invention.

The advantage of the present invention is to burn the local address data 208 into the light emitting diode driving apparatus 10 which had been manufactured to store or change the local address data 312, and the light emitting diode driving apparatus 10 can be burned repeatedly. Moreover, compared to the burning data being sent through the power carriers when burning, the present invention can avoid incorrectly determining the conventional carrier signals as the burning signal.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A burning address method for a light emitting diode lamp receiving a contactless burning signal and comprising:
   the light emitting diode lamp wirelessly receiving a wireless signal from a burner;
   the light emitting diode lamp determining whether the wireless signal comprises a wireless starting signal or not;
   if the wireless signal comprises the wireless starting signal, the light emitting diode lamp performing a burning procedure to convert a wireless address signal in the wireless signal into a local address data and storing the local address data into an address memory;
   if the wireless signal does not comprise the wireless starting signal, the light emitting diode lamp omitting the burning procedure; and
   after the light emitting diode lamp finishes the burning procedure, performing a verification procedure to wirelessly transmit the local address data stored in the address memory to a verification module, so that the verification module determines whether the local address data wirelessly received by the verification module is the same with the local address data in the wireless address signal or not.

* * * * *